(12) United States Patent
Teves et al.

(10) Patent No.: US 7,128,674 B2
(45) Date of Patent: Oct. 31, 2006

(54) FRICTIONALLY ENGAGED DRIVING BELT

(75) Inventors: Reinhard Teves, Seelze (DE); Jörg Wolters, Garbsen (DE); Klaus-Lüder Mahnken, Ahausen (DE); Joachim Nau, Hannover (DE); Reinhold Moses, Eimen (DE); Tobias Nonnast, Barsinghausen (DE); Ymte Greydanus, Barsinghausen (DE)

(73) Assignee: Contitech Antriebssysteme GmbH (DE)

( * ) Notice: Subject to any disclaimer, the term of this patent is extended or adjusted under 35 U.S.C. 154(b) by 115 days.

(21) Appl. No.: 10/240,947

(22) PCT Filed: Mar. 30, 2001

(86) PCT No.: PCT/EP01/03664

§ 371 (c)(1),
(2), (4) Date: Nov. 7, 2002

(87) PCT Pub. No.: WO01/75330

PCT Pub. Date: Oct. 11, 2001

(65) Prior Publication Data

US 2003/0139242 A1 Jul. 24, 2003

(30) Foreign Application Priority Data

Apr. 3, 2000 (DE) ................ 100 16 351

(51) Int. Cl.
*F16G 5/04* (2006.01)
*F16G 5/20* (2006.01)
(52) U.S. Cl. ............... 474/238; 474/264; 474/260
(58) Field of Classification Search ........... 474/260, 474/263–265, 237, 138; 156/137–140; 428/131, 428/36.1; 442/20, 46
See application file for complete search history.

(56) References Cited

U.S. PATENT DOCUMENTS

| | | | | |
|---|---|---|---|---|
| 3,190,137 A | | 6/1965 | Adams, Jr. | |
| 3,930,418 A | * | 1/1976 | Dutton | 474/264 |
| 4,589,941 A | * | 5/1986 | Tanaka et al. | 156/140 |
| 5,266,076 A | * | 11/1993 | Chitrangad et al. | 8/115.6 |
| 5,385,765 A | * | 1/1995 | Springer et al. | 428/131 |
| 5,904,630 A | | 5/1999 | Berthelier | |
| 6,482,118 B1 | * | 11/2002 | Watanabe et al. | 474/263 |

FOREIGN PATENT DOCUMENTS

| | | |
|---|---|---|
| DE | 1 168066 | 4/1964 |
| EP | 0 317 316 | 5/1989 |
| EP | 0 455 417 | 11/1991 |
| EP | 0 642 886 | 3/1995 |
| EP | 0 647 797 | 4/1995 |
| EP | 0 662 571 | 7/1995 |
| EP | 0663544 A1 * | 7/1995 |

(Continued)

*Primary Examiner*—Marcus Charles
(74) *Attorney, Agent, or Firm*—Robert W Becker & Associates; Robert W Becker

(57) ABSTRACT

The invention relates to a frictionally engaged driving belt having a base body (2) and a cover layer (1) that consists of rubber or a rubber-like synthetic material which is provided with a tractive support layer (3) that is embedded into the rubber or the rubber-like synthetic material. The aim of the invention is to prevent or reduce the generation of noise in drives of the belts. Only the surface or a portion of the surface, preferably the motion-transferring part of the surface, pertaining to the driving belt is provided with a flocking material consisting of short aramide fibers (5). A portion of said aramide fibers (5) is integrated into the surface only with a partial length of each individual fiber.

12 Claims, 1 Drawing Sheet

FOREIGN PATENT DOCUMENTS

| | | |
|---|---|---|
| EP | 0 622 563 | 11/1995 |
| EP | 0 857 887 | 8/1998 |
| EP | 1 052 425 | 11/2000 |
| EP | 1067065 A2 * | 1/2001 |
| EP | 1 079142 | 2/2001 |
| EP | 1 108750 | 6/2001 |
| JP | 60-156800 A * | 8/1985 |
| JP | 07-63241 A * | 3/1995 |
| JP | 08-74121 A * | 3/1996 |
| JP | 09-59864 A * | 3/1997 |
| JP | 11-11121 A * | 1/1999 |

\* cited by examiner

FRICTIONALLY ENGAGED DRIVING BELT

CROSS REFERENCE TO RELATED APPLICATION

The specification incorporates by reference the disclosure of DE 100 15351.3 filed 3 Apr. 2000 and PCT/EP01/03664 filed 30 Mar. 2001.

BACKGROUND OF THE INVENTION

The invention relates to a frictionally engaged driving belt having a base body and a cover layer comprised of rubber or a rubber-like synthetic material (i.e. an elastomeric synthetic material) which is provided with a load-carrying or tractive support layer that is embedded into the rubber or the rubber-like synthetic material.

In connection with frictionally engaged driving belts or force transmission belts such as, for example, flat belts, V- or wedge belts, and poly-V- or wedge rib belts, these are commonly deployed in situations in which a large transmission ratio must be realized and a high demand is placed on the belt in view of the expected wear resistance, noise handling capability, and dynamic load capacity. Thus, driving belts are deployed, for example, for force transmission in application areas ranging from office machines up to the heaviest machine drives. Driving belts are deployed in manifold configurations as well with respect to vehicles and, indeed, especially in those circumstances concerning a de-coupling of the oscillations of the drive assemblies and the associated driven assemblies. V-belts are, for example, deployed in vehicles for the driving of electrical generators (alternators). Ribbed V-belts offer the advantage that they combine the high flexibility of flat belts with the efficient power transmission of V-belts and also can be deployed in complex drive constructions involving bending of the belt during reverse belt travel effected via change of direction rollers and moving idlers.

In drive elements, the outer surfaces of the belt are subjected to various weather and operational medium influences. In spite of these influences, the belt should exhibit a long operational life and, at the same time, in particular in the areas of vehicle and domestic product industry applications, the running noise should be minimized. Noises occur due to drive elements which act to create frictional traction for effecting the transmission of force by the belt and frequently, if, for example, during wet, cold weather, certain friction behaviors occur between the belt surface and the drive disc or pulley, squeaking tones emanating from oscillations or vibration will occur. These noises can be minimized or damped via various measures.

Different approaches have been proposed to minimize the noise development ensuing from frictionally engaged driving belts depending upon the respective manufacturing process for manufacturing the driving belt. If one, for example, takes note of such approaches from the perspective of the manufacturing processes for ribbed V-belts, in connection with which substantially two manufacturing processes, the cutting process and the molding process, have come to the fore, it is known to mix in fibers into the rubber mixture formulated for the ribs to reduce the development of noise from the belt via travel over the belt disk.

The cutting process for belts with fiber-containing mixtures is known, for example, via the disclosure in EP 642 886 A1. In connection with cutting processes, belt layers are produced and vulcanized which have a flat outer surface. Thereafter, the ribs are cut into the vulcanized belt surface. Via the calendering process during the production of the mixing plate for the belts, the mixture is provided with the fibers, which are preferably oriented transversely to the belt running direction. In the cutting process, the ribs are then cut out of the material such that the tips of the fibers extend outwardly out of the mixture surface. For the mixing in of such fibers in rubber mixtures, fiber materials such as cotton, polyester, polyamide such as, for example, nylon, and aramid are used. The favorable noise handling behaviors of such belts frequently do not remain over the entire operational life of the belt as the ribbed surface is eventually frictionly abraded to a smooth surface via passage over the disks and there remains no more of the outwardly projecting fibers which promote favorable friction conditions and a reduction of noise.

In a cutting process, a large portion of the often very expensive fiber reinforced mixture is thrown away as cutting waste. The alternative to the cutting processes is the ecologically and economically progressive molding process for the manufacture of ribbed V-belts which is, at the same time, more precise than the cutting process. In this connection, during the vulcanization process, the ribs are impressed into the substantially flat plate of an unvulcanized belt layer to project therefrom. In a molding process, as well, fibers can be mixed into the rubber mixture which forms the rib and can be vulcanized in therewith as is disclosed, for example, in U.S. Pat. No. 5,904,630. The fibers succeed thereby into locations in the interior of the ribs of the rib contour. Additionally, it is known from U.S. Pat. No. 5,904,630 to cut the ribs into the belt, still in a surface location, after the molding of the belt via the molding process in order to effect a working out of the fibers distributed within the mixture and thereby obtain a surface with fibers projecting therefrom. The durability of this noise reducing layer is comparable to that of a layer produced by the conventional cutting process.

Both the cutting and molding processes have in common that the frequently expensive fibers are present throughout the entire thickness of the rib rubber, although they are needed only on the surface. Moreover, the overall thickness of the fiber distribution is dictated by the desired characteristics of a belt mixture such as flexibility or workability and cannot therefore be increased arbitrarily to a more desirable value. Typical values for the portion of fibers in a belt mixture lie between 2 to 30 percent by weight of fibers per 100 percent by weight of total elastomer. It is more effective, in contrast, to place the fibers only at locations at which they are also required—namely, on the rib surfaces. Belts have heretofore been manufactured wherein the rubber mixture plate for the ribs has been provided with a securement layer on which thereafter short fibers have been distributed in a layering process as is disclosed, for example, in U.S. Pat. No. 3,190,137. The fibers produce, due to the concentrated application thereof in a thin layer, an effective noise reduction and, at the same time, produce, in most instances, an improvement in wear or abrasion. Typically, it is common in such layers to use short cotton fibers which exhibit a good compromise between cost and noise reduction. Wool is not suitable for the thermal demands which are imposed on the material. In connection with synthetic fibers such as aliphatic polyester, for example, based on polyethylene terephtalate or polyethylene napthenate, polyamide 6, or polyamide 6.6, no positive influence is found on the noise behavior so that deployment of these fibers does not make sense to achieve a noise reduction. The smooth surfaces of these synthetic fibers appear to be responsible for the fact that, evidently, no satisfactory positive influences on the friction behavior and dampening of noise are effected.

The present invention provides a solution to the challenge of providing a frictionally engaged driving belt in which a noise development in the driving of the belt is minimized or prevented.

SUMMARY OF THE INVENTION

This challenge is met by the invention in that only the surface or a portion of the surface of the driving belt—preferably, the movement transmitting portion of the surface—is provided with a flocking material comprised of short aramid fibers, whereby, with respect to a portion of the aramid fibers—preferably the overwhelming number of the aramid fibers—only a partial length of each individual fiber is bound into the surface.

It has been established that, surprisingly, aramid fibers, by which it is conventionally recognized to include synthetic fibers, hinder or prevent the occurrence of noises in a very good manner or, respectively, effect a very good noise dampening. This positive relationship is especially evident if the aramid fibers come to be concentrated on the surface of the belt. This is so because a belt, which is manufactured via a cutting process, or whose surface is cut after the forming thereof via a molding process, and which comprises aramid fibers which have been worked into the rib mixture, in fact exhibits no better noise behavior as compared to a belt having fibers of another material. The aramid fibers which have been worked into the belt, in comparison to other fibers which are worked to the belt, bring forth solely an improvement of the wear or abrasion behavior due to the good wear or abrasion resistant fiber tips.

In the inventive driving belts, the belts can be, for example, flat belts, V-belts, or ribbed V-belts, whereby the entire surface of the driving belt can be provided with flocking material comprised of short aramid fibers. The positive influence of the layer of aramid fibers makes itself especially noticeable in belts trained over disks, rollers, or wheels in direct contact therewith and in applications in which oscillation and vibrations can occur. The belts can be provided, for example, on their underside with the flocking material comprised of short aramid fibers, as the underside of the belt frequently travels over the change of direction rollers and tensioning rollers. It is especially advantageous, in any event, if the belt has the movement transmitting portion of its surface covered with aramid fibers as this portion of the surface is especially strongly subjected to various fiction behaviors with the consequently resulting noise (squeaking) effects. In connection with the flocked surface, a rubberized reinforcement layer (a sheath ply) can be deployed which provides the belt with additional protection against wear or abrasion and which, in any event, provides,a certain positive influence on the friction behavior and noise.

The inventive driving belt can be produced via the ecological and economically progressive molding process in which no material need be polished. Since no fibers need to be worked into the mixture, one can achieve a higher total flexibility of the mixture as compared to a mixture comprising fibers. The use of aramid fibers offers, in contrast to the use of cotton fibers, the advantage that the aramid fibers do not swell. The friction behavior of a belt provided as such with aramid fibers is thus substantially independent of the moisture content of the surroundings.

The aramid fibers advantageously have a length of 0.1 to 6 mm and a diameter of 5 to 25 μm. If the fibers are longer and thinner, working problems occur for the reason that the fibers clump together in a batting-like shape and are not uniformly dosed or distributed during the flocking operation. If the fiber length exceeds, in the case of a ribbed V-belt, approximately three to four times the intra-rib distance, this can lead to molding problems during the finishing of the ribs. Moreover, fiber lengths in the above-noted regions have shown themselves to be optimal for the anchoring of the fibers. Short fibers do not extend sufficiently into the securement layer and lie in a quasi-powder type manner on the respective surface subjected to the flocking treatment. Fibers which are too long extend, to be sure, sufficiently into the surface but, however, due to the unfavorable relationship between those fibers which are bound into the belts and those fibers which are not bound into the belt, such overly long fibers are only slightly fixedly secured or clamped into the surface and are easily pulled or ripped out of the belt during its operation.

Other flocking measures including flocking with ground fibers (ground flocking) as well as cut fibers (cut flocking) can also be used.

To effect the application of the short aramid fibers, the belt surface of the unvulcanized belt is prepared via the moistening thereof via a solvent, or through the prior application of an adhesive or a securing solution, such that the fibers can be secured to the surface. The fibers are then mechanically brought onto the surface via a process in which they are strewn on the surface, blown on the surface, or shaken onto the surface or applied with the assistance of an electrical field or applied through a combination of these methods. During the flocking application with the help of an electric field, also called an electrical flocking application, the fibers are electrically charged, oriented, and accelerated by a high tension electrode and fly in correspondence with the field lines toward the opposite pole—namely, the surface being subjected to the flocking treatment. This process offers the advantage that the fibers are uniformly distributed during the flocking treatment and come to rest in substantially vertical orientations on the surface. Moreover, the fibers are strongly accelerated in the electrical field, so as to consequently embed themselves deeper in the surface which, furthermore, has the effect of producing a better anchoring of the fibers. One can achieve a very large flocking thickness with the substantially vertical standing fibers distributed on the surface.

In order to ensure an electrostatic flocking treatment can be effectively accomplished, it has turned out to make sense to distribute, in an untreated condition, the aramid fibers with an anti-static or electrically conducting capable coating (preparation, outfitting). In this manner, the fibers quickly take up a charge and discharge a charge.

The aramid for the flocking fibers can comprise co-polymers having predominantly terephthalic acid and p-phenyl diamine (para-aramids), such as, for example, Kevlar® or Twaron®, as well as co-polymers having predominantly m-phenyl diamine and isophthalic acid (meta-aramids) such as, for example, Nomex®. The co-polymers can also, however, have further monomers polymerized therein. Thus, terpolymers comprised of terephthalic acid, p-phenyl diamine, and further monomers such as, for example, Technora®, can be used. Co-ploymers of terephthalic acid and p-phenyl diamine such as Kevlar® or Twaron® offer good stiffness of the fibers and, consequently, good noise dampening. This material is, however, dynamically not very durable so that, under extreme dynamic loading, the material can break. Meta-aramids such as Nomex are significantly more durable and dynamically stable but yield, however, less noise dampening due to increased flexibility; they offer, moreover, the advantage that they can be colored and avoid the rather unsightly yellow color which belts comprised of Kevlar®, Twaron® or Technora® have. Terpolymers comprised of terephthalic acid, p-phenyl diamine, and further monomers such as Technora® are to regarded as between pure meta-aramids and para-aramids with respect to both principal properties of flexibility and resistiveness.

In accordance with an advantageous further embodiment of the invention, the driving belt or a portion of the driving belt comprises a polymer-containing outer coating which is, via a vulcanization process, securely connected and/or cross-linked to the rubber or the rubber-like synthetic material of the base body and/or the cover layer, and, with respect to a portion of the aramid fibers in this outer layer, only a portion of the longitudinal extent of each of its fibers extends into the layer. The polymer-containing outer coating acts as an adhesion material for the fibers and offers, additionally, the advantage that it is, due to the tight connection with the rubber or the rubber-like synthetic material of the belt, optimally securely connected to the belt surface. This polymer-containing layer can be comprised, for example, of a rubber mixture, a urethane system, or a system having a cyanate acrylic base in an organic solvent. These polymer-containing layer solutions are of the type which are provided either with suitable polymers alone or with filling material and vulcanization systems as well. Such solutions are frequently deployed as securement systems via which both the adhesion between the solution and the mixture disposed thereunder as well as the adhesion of the fibers is ensured. Securement systems are preferably modified phenol resins or resorcin resins which comprise formaldehyde dispensing systems such as hexa-metholoxyymethol melamine or urotropine. Securement solutions for such purposes are preferably provided with vulcanization systems having sulfur or peroxide bases. Sulfur systems themselves comprise accelerators formed of sulfonamides, dithicoarbamates, guanidin or thiuram bases or other systems; peroxide systems can comprise salt or ester polymerized unsaturated organic acids such as acrylic acids or methacrylic acids.

Additionally, the polymer-containing layer can be created such that the belt is improved from the perspective of further relevant properties. Thus, for example, the wear or abrasion capacity and, consequently, the operational life of the belt, the friction behavior of the belt and, as well, the noise handling behavior of the belt can be additionally positively influenced. This can be brought about, for example, by providing the polymer-containing outer coating with a fluoride polymer. The fluoride polymers can influence, in particular, the sliding behavior of the surfaces and are optimally inert and friction-resistant. In accordance with a preferred embodiment, polytetrafluoroethylene (PTFE) is deployed as the fluoride polymer. A better securement to the polymer and, consequently, better wear resistance, is achieved, however, by use of co-polymers or terpolymers such as, for example, ethylene-tetrafluoroethylene-co-polymers or tetrafluoroethylene-hexafluoropropylene-vinyl fluoride-terpolymers. Such polymers are obtainable, for example, as a product of the Dyneon GmbH company sold under the trademark name Dyneon THV®.

In accordance with a preferred embodiment of the invention, the driving belt is a ribbed V-belt whose rib surface is provided with a flocking material comprising short aramid fibers. In this embodiment, there was a particularly large positive influence on the layer with short aramid fibers with respect to the development of noise during driving movement of the belt.

The inventive driving belt can be produced by conventionally known processes.

BRIEF DESCRIPTION OF THE DRAWINGS

In the following description, the invention is further described in an exemplary example in connection with the following figures, without limiting the invention, however, to this exemplary example.

DESCRIPTION OF THE PREFERRED EMBODIMENTS OF THE INVENTION

Figure 1:
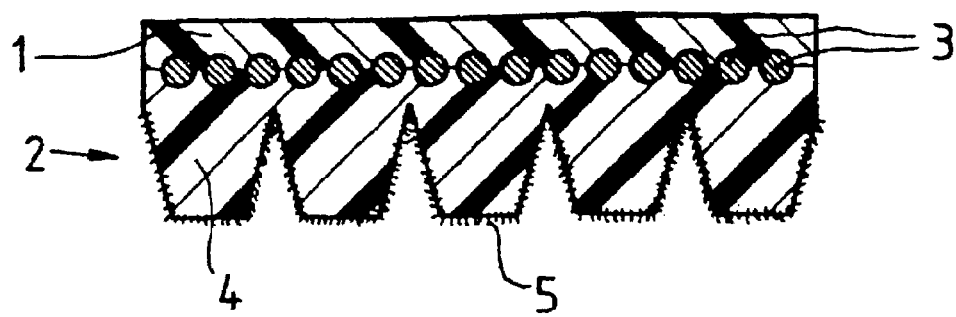
FIG. 1 schematically shows the cross-section of a ribbed V-belt with ribs having flocking material thereon.

The ribbed V-belt shown in FIG. 1 comprises a cover layer 1 and a base body 2 formed of rubber or rubber-like synthetic material as well as a load-carrying or tractive layer 3 embedded in the rubber or the rubber-like synthetic material. The ribs 4 of the ribbed V-belt have a flocking application thereon comprised of short aramid fibers 5, with only a portion of the longitudinal extent of each of such fibers being bound into the surface of the ribs 4.

Figure 2:
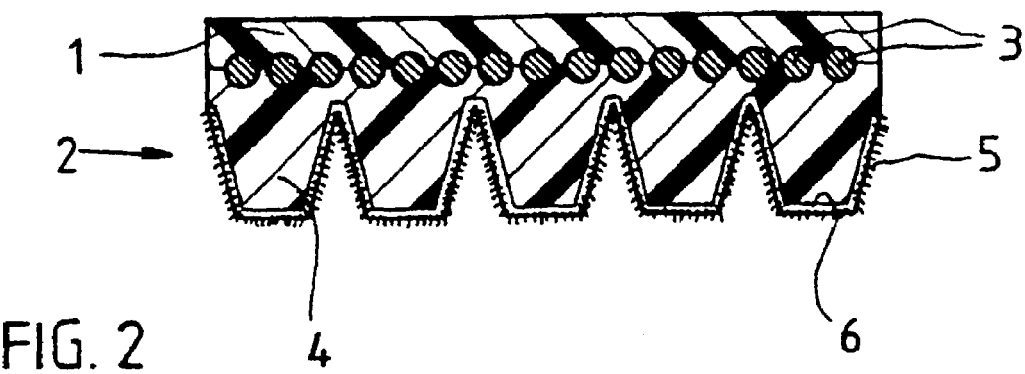
FIG. 2 schematically shows the cross-section of a ribbed V-belt whose ribs are provided with a polymer-containing outer coating with a flocking application thereon.

A cross-section of a ribbed V-belt with a base body 2, a cover layer 1, and a tractive layer 3 is shown in FIG. 2, the belt having a polymer-containing outer coating 6 on its ribs 4, into which only a portion of the longitudinal extent of each of the short aramid fibers 5 is bound.

The ribbed V-belts shown in FIGS. 1 and 2 exhibit, for example, during the deployment thereof as a belt drive for the driving of the electrical generator in vehicles, a clearly reduced noise development characteristic.

REFERENCE CHARACTER LIST

1 Cover layer
2 Base body
3 Tractive support layer
4 Ribs
5 Aramid fibers
6 Polymer-containing outer coating

The invention claimed is:

1. A frictionally engaged driving belt, comprising:
a base body;
a cover layer disposed on said base body, wherein said base body and said cover layer are formed of a selected one of a rubber material, an elastomeric synthetic material, and a mixture of a rubber material and an elastomeric synthetic material; and
a tractive layer embedded in the selected one of the rubber material, the elastomeric synthetic material, and the mixture of the rubber material and the elastomeric synthetic material, wherein at least a portion of a surface of the belt is provided with a flocking material of short aramid fibers, wherein only a portion of the longitudinal extent of at least a portion of the aramid fibers is bound into the surface, and wherein the remainder of the belt that does not form the surface of the belt is devoid of fibers.

2. A frictionally engaged driving belt according to claim 1, wherein the majority of the aramid fibers have only a portion of the longitudinal extent thereof bound into the surface.

3. A frictionally engaged driving belt according to claim 1, wherein the individual aramid fibers have a length of 0.1 to 6 mm and a diameter of 5 to 25 µm.

4. A driving belt according to claim 1, wherein the aramid fibers are provided with an anti-static or an electrically conducting coating.

5. A driving belt according to claim 1, wherein the aramid fibers are comprised of a co-polymer having predominantly terphthalic acid and p-phenyl diamine.

6. A driving belt according to claim 1, wherein the aramid fibers are comprised of a co-polymer having predominantly isophthalic acid and m-phenyl diamine.

7. A driving belt according to claim 1, and further comprising a polymer-containing outer coating which is, via a vulcanization process, securely connected by at least one of non cross-linked securement and cross-linked securement to the rubber or the elastomeric synthetic material of at least one of the base body and the cover layer, and the aramid fibers are bound into the coating.

8. A driving belt according to claim 7, wherein the polymer-containing outer coating comprises fluoropolymer.

9. A driving belt according to claim 8, wherein the fluoropolymer is polytetrafluoroethylene.

10. A driving belt according to claim 8, wherein the fluropolymer is a co-polymer of ethylene and tetrafluoroethylene.

11. A driving belt according to claim 10, wherein the fluoropolymer is a terpolymer formed of tetrafluoroethylene. hexafluropropylene, and vinyl fluoride.

12. A driving belt according to claim 1, wherein the driving belt is a ribbed V- belt whose rib surface is provided with the flocking material comprised of short aramid fibers.

* * * * *